Figure 6:
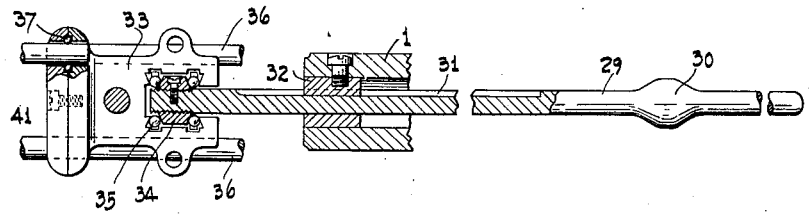

Oct. 3, 1939.  H. E. AVONDE ET AL  2,175,012
VARIABLE SPEED TRANSMISSION
Filed Aug. 27, 1938   2 Sheets-Sheet 1
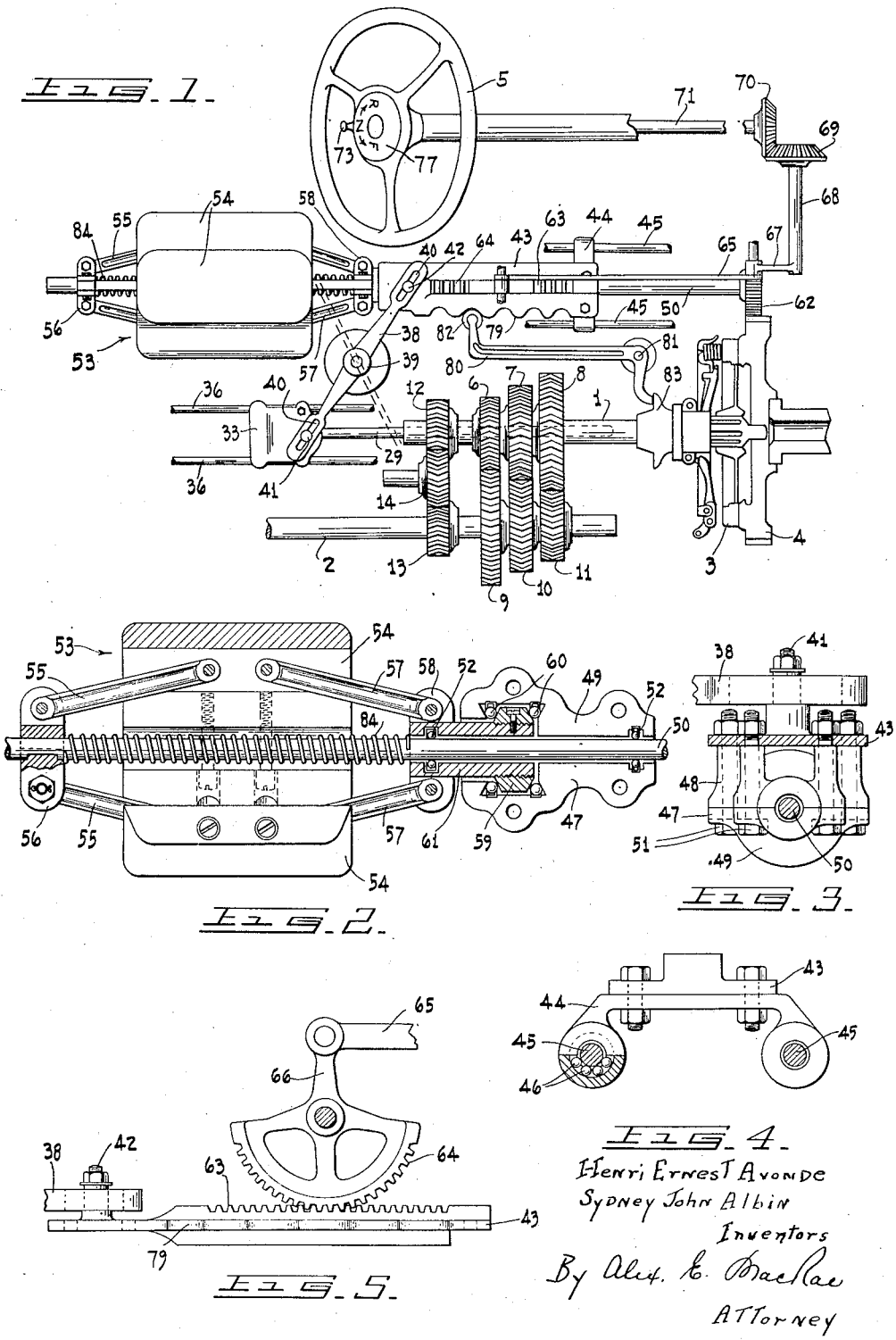

Oct. 3, 1939.  H. E. AVONDE ET AL  2,175,012
VARIABLE SPEED TRANSMISSION
Filed Aug. 27, 1938  2 Sheets-Sheet 2

Henri Ernest Avonde
Sydney John Albin
Inventors

By Alex. E. MacRae
Attorney

Patented Oct. 3, 1939

2,175,012

UNITED STATES PATENT OFFICE 2,175,012

VARIABLE SPEED TRANSMISSION

Henri Ernest Avonde and Sydney John Albin, Hamilton, Ontario, Canada

Application August 27, 1938, Serial No. 227,080

3 Claims. (Cl. 74—336.5)

This invention relates to variable speed transmissions and more particularly to a transmission wherein means are provided for automatically connecting driving and driven shafts at different speed ratios.

An object of the invention is to provide a simple arrangement, which will be positive in operation, for effecting automatically the variable speed connections between the driving and driven shafts in accordance with the speed of rotation of the driving shaft.

Another object is to provide an automatic transmission device with which may be conveniently incorporated a means for synchronously actuating a clutch in association therewith.

Other objects of the invention will be apparent from the description which follows with reference to the accompanying drawings, in which—

Figure 1 is a diagrammatic plan of an arrangement according to the invention; and Figures 2 to 10 are enlarged sectional views of various details of the arrangement shown in Figure 1.

The invention as illustrated is adapted to be applied to a conventional motor car having a driving shaft 1, a driven shaft 2, a clutch 3 in the driving shaft, a fly wheel 4 on the driving shaft and a steering wheel 5.

The transmission is adapted to provide the usual three speeds forward and one speed reverse. The three speeds forward are obtained through three gears 6, 7 and 8 on the driving shaft and three gears 9, 10 and 11 on the driven shaft in constant mesh therewith. These gears are of varying diameter corresponding with the varying speeds required. Reverse speed is obtained through a gear 12 on the driving shaft, a gear 13 on the driven shaft and an idler gear 14 in constant mesh with each gear 12 and 13. All of the gears are preferably of the double helical type to ensure greater efficiency and more silent operation.

Figure 7:
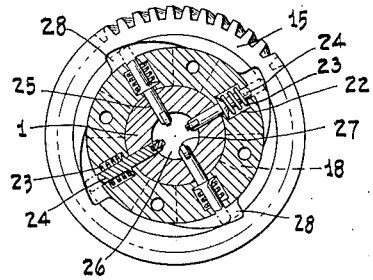
Figure 8:
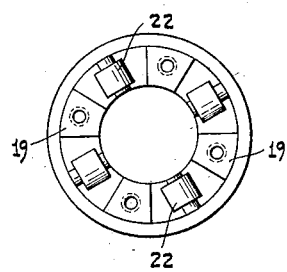
Figure 9:
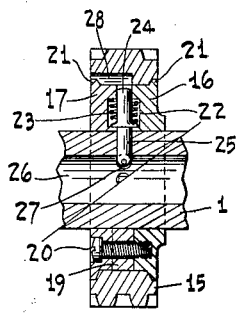

Gears 6, 7, 8 and 12 are of special construction whereby they may be locked to the driving shaft for rotary movement therewith or may be disconnected in part therefrom to allow the gear face to remain stationary irrespective of revolution of the shaft. As shown in Figures 6, 7 and 8, each of these gears comprises an external annular member 15 and an internal member composed of two parts 16 and 17 mounted on the driving shaft 1. The parts 16 and 17 are in the form of annular plates which fit into locking engagement with each other. Part 16 has key recesses 18 therein to receive keys 19 on part 17, the parts being secured together by locking screws 20. A flange 21 is formed on the outer peripheral edge of each part 16 and 17 to provide a groove in which the external member 15 seats. The inner face of each part 16 and 17 is recessed to form housings 22 each adapted to receive a spring 23 and plunger 24. The plungers 24 extend through corresponding openings 25 in the shaft 1 and normally project through such openings into a bore 26 in the shaft under the influence of springs 23. The inner ends of the plungers are provided with rollers 27. Notches or recesses 28 are formed in the external member 15, each notch being adapted to receive the outer end of a corresponding plunger. The edges of the notches and of the heads of the plungers are bevelled as shown to ensure a ready engagement and disengagement of the plunger heads and the notches.

Means for forcing the plungers outwardly to engage the notches 28 and thus lock the external and internal gear members together comprises a control rod 29 slidingly mounted within the bore 26 and having a cam surface 30 thereon adapted to engage the inner ends of the plungers and force the same outwardly.

As illustrated clearly in Figure 6, the control rod 29 extends through the end of the driving shaft 1, a keyway 31 being formed in the rod and a key bushing 32 being provided in the bore adjacent the end of the shaft.

The outwardly extending end of the control rod 29 is swivelly secured in a housing 33. The swivel mounting comprises a bearing 34 screwed onto the end of the rod, which bearing freely revolves on ball bearings 35. The housing 33 is slidingly mounted on glide rods 36, ball bearings 37 being provided in the housing for ease of movement.

Movement of the housing with control rod along the glide rods 36 is effected by means of an arm 38 pivotally mounted at 39 and having slots 40 in either end thereof. A pin 41 carried by housing 33 extends through one of the slots 40 and a pin 42 carried by a sliding platform or carriage 43 extends through the other slot. The platform 43 is mounted at one end on a bracket 44 slidingly carried by glide rods 45. Ball bearings 46 may be provided in the bracket for ease of movement as shown in Figure 4. The other end of platform 43 is mounted on a housing 47. The housing 47 is composed of two parts 48 and 49, whereby the same may be mounted on a shaft 50 by means of bolts 51 which extend through each part and the platform 43. The housing 47 slides on the shaft 50 with the platform 43, ball bearings 52 being provided as shown in Figure 2.

Sliding movement is imparted to the platform 43 by means of a centrifugally responsive device 53. This device comprises a plurality of iron weights 54 connected from one end by means of links 55 mounted on a bracket 56 keyed to the shaft 50 and connected from the other end by means of links 57 mounted on a bracket 58 rotatably mounted on shaft 50 and swively anchored in housing 47. As illustrated in Figure 2, the latter swivel mounting comprises a bearing 59 mounted on ball bearings 60 within the housing 47 and screwed onto a portion 61 of the bracket 58 which extends into the housing. A spring 84 mounted on shaft 50 and extending between brackets 56 and 58 tends to urge the weights 54 into their normal at rest position.

Rotary movement of the shaft 50 is imparted thereto by means of a relatively small gear 62 thereon which meshes with the flywheel gear 4.

Figure 10:
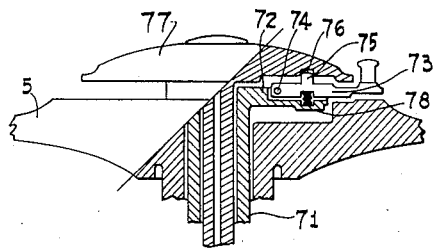

Sliding movement may also be imparted to the platform 43 by manual means comprising a rack 63 on the platform and a suitably mounted gear segment 64 meshing therewith. A connecting rod 65 is provided between an arm 66 of the segment 64 and a crank arm 67 on a shaft 68. A bevel gear 69 on shaft 68 meshes with a bevel gear 70 on a shaft 71 which may extend within the steering column as shown in Figure 10, upwardly to the steering wheel 5. A crank arm 72 is formed on the end of shaft 71 and a control handle 73 is secured thereto. As shown, the handle 73, which is pivoted at 74, has a projection 75 thereon adapted to fit into one of two corresponding recesses 76 in a steering wheel member 77. A spring 78 urges the handle upwardly whereby, when the projection 75 is in registry with one of the recesses 76, it will automatically engage the same to lock the handle in a certain position.

The control handle, which is adapted to place the mechanism in neutral, reverse or forward driving positions, is arranged to be locked, in the manner just described, in neutral or reverse driving positions but not in forward driving position. The three positions may be designated on the steering wheel as illustrated in Figure 1.

Means for synchronously actuating the clutch 3 is provided and comprises a cam rack 79 on the platform 43 and a lever 80 pivoted at 81 having one end provided with a suitable cam engaging surface, such as a wheel 82, and the other end engaging the member 83 of the clutch and adapted to apply pressure thereon to release the clutch.

The specific operating details of the invention will now be described.

With the control handle 73 locked in neutral position, the various parts of the apparatus are so arranged that the cam-engaging wheel 82 of the lever 80 is positioned in one of the depressions of the cam rack and the clutch engaged, and the cam surface 30 of the control rod 29 is positioned between gears 6 and 12 on the driving shaft and all gears of the transmission are motionless.

With the motor idling and a forward movement of the vehicle desired, the handle 73 is depressed by the driver to disengage the lock and moved to the right. In this connection, it should be noted that the placement of the "neutral" setting is located slightly in advance of the normal at rest position of the centrifugal device, such point being the center of balance between the centrifugal and spring pressures. Thus, ease of movement of the control handle either to "forward" or "reverse" position from "neutral" is assured. With release of the handle from its locked position, the control rod 29 is now freely responsive to actuation by the centrifugal device. It will be noted that the centrifugal device is directly responsive to the speed of the motor since the shaft 50 is rotated by the fly wheel 4. Moreover, the shaft 50 is caused to rotate at a speed ratio considerably faster than that of the motor thus permitting the use of minimum size of iron weights in relation to the centrifugal force generated.

With acceleration of the motor, therefore, the weights 54 move outwardly to pull platform 43 to the left and move the control rod 29 to the right. This movement of the control rod places its cam surface 30 into engagement with plungers 24 of gear 6 to connect the same with the driving shaft for rotary movement therewith. The clutch actuating mechanism is so synchronized with the latter operation that during the connection of the gear 6 with the driving shaft, the clutch is released through actuation of the lever 80 by engagement of a projecting surface of the cam rack 79 with the wheel 82. As the connection is completed, the clutch is allowed to engage and motion is transmitted from the driving shaft through gears 6 and 9 to the driven shaft. As the acceleration of the motor and vehicle increases, the pull of the centrifugal device increases and the gear connections are automatically shifted from gears 6 and 9 to gears 7 and 10 and then to gears 8 and 11, which constitute the normal driving or high gear connection. The spacing between each gear constitutes the idling period of the gear shift synchronizing with the clutch release. The cam surface of the cam rack 70 permits a gradual engagement and disengagement of the clutch and the timing thereof is so related to the gear changing mechanism that there is no "grab" or jerkiness in the movement.

When acceleration is decreased, a reverse gear shifting action automatically takes place, this action constituting a braking force of great value in the operation of the vehicle. Thus, when it is desired to stop the vehicle, the accelerator is released and the brakes applied. The gears automatically shift from high to second to low speeds and finally to neutral, in which the mechanism is locked automatically. Moreover, the proper gear connection will be selected to meet all driving conditions. When ascending a steep grade, for instance, should the pull on the motor reach a certain value, an automatic shift to second or first speed will be made. Should it be necessary to slow up the vehicle, the proper gear connection will be selected to maintain the vehicle at any desired low speed. Acceleration of the vehicle and shifting from low to second to high speeds is accomplished at any rapidity the driver may desire depending upon the acceleration imparted to the motor. Should the motor become stalled for any reason, the transmission reverts itself to low gear and thence to neutral position immediately.

When it is desired to proceed in reverse gear, the handle 73 is moved to the reverse position where it is locked in position. This movement shifts control rod 29 to place its cam surface 30 in engagement with the plungers 24 of gear 12 whereupon the latter rotates with driving shaft 1 and imparts reverse rotary movement to driven shaft 2. The clutch 3 is synchronously actuated in relation to the latter operation in the manner previously described.

The spring 84 is preferably provided with an overplus tension and the weights 54 are likewise preferably provided with an overplus capacity.

This overplus reserve in the centrifugal device assures a more efficient operation of the mechanism. Thus, the equilibrium of the centrifugal device is such that the spring tension provides a thrust which is more than sufficient to accomplish its work of effecting the shift from high speed to neutral and the centrifugal balance of power provides more than the required pull to compress the spring and effect the shift from low to high speeds.

We claim:

1. In an automatic transmission having a driving shaft and a driven shaft, a series of gears on the driving shaft normally in disconnected driving relation therewith, a second series of gears on the driven shaft in constant mesh with said first series of gears, a cam member arranged to connect successively each of the gears of the first series with the driving shaft to be driven thereby, and automatic means for actuating said cam member comprising a control shaft geared to the driving shaft for rotation at a higher rate of speed than the driving shaft, centrifugal means responsive to the speed of rotation of said control shaft, a reciprocally mounted platform movable by said centrifugal means, and a pivotally mounted arm having one end connected to said platform and the other end connected to said cam member.

2. An automatic transmission having a driving shaft, a driven shaft, a normally engaged clutch in said driving shaft, a gear fixed to the driving shaft at one side of said clutch, a series of gears on the driving shaft at the other side of said clutch and normally in disconnected driving relation therewith, a series of gears on the driven shaft in constant mesh with the first series of gears, a reciprocally mounted cam member arranged to connect successively each of the gears of the first series with the driving shaft to be driven thereby, and automatic means for actuating said cam member comprising a control shaft having a relatively small gear meshing with said first-mentioned gear whereby said control shaft may be rotated by the driving shaft at a higher rate of speed than that of the driving shaft, centrifugal means responsive to the speed of rotation of said control shaft, a reciprocally mounted platform movable by said centrifugal means, and a pivotally mounted arm having one end connected to said platform and the other end connected to said cam member.

3. An automatic transmission having a driving shaft, a driven shaft, a normally engaged clutch in said driving shaft, a gear fixed to the driving shaft at one side of the clutch, a series of gears on the driving shaft at the other side of the clutch and normally in disconnected driving relation therewith, a series of gears fixed to the driven shaft in constant mesh with the first series of gears, a reciprocally mounted cam member arranged to connect successively each of the gears of the first series with the driving shaft to be driven thereby, a control shaft geared to said first-mentioned gear for rotation by the driving shaft at a higher rate of speed than that of the driving shaft, centrifugal means responsive to the speed of rotation of the control shaft, a reciprocally mounted platform movable by said centrifugal means, a pivotally mounted arm for actuating said cam member having one end connected to said platform and the other end connected to said cam member, a cam surface on said platform, and a pivotally mounted arm for actuating said clutch having one end engaging said cam surface and the other end engaging said clutch.

HENRI ERNEST AVONDE.
SYDNEY JOHN ALBIN.